(12) United States Patent
Chu (10) Patent No.: US 10,613,292 B2
(45) Date of Patent: Apr. 7, 2020

(54) OPTICAL FILTER SWITCH MODULE AND LENS ASSEMBLY

(71) Applicant: Lite-On Technology Corporation, Taipei (TW)

(72) Inventor: Hung-Yun Chu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 257 days.

(21) Appl. No.: 15/821,763

(22) Filed: Nov. 23, 2017

(65) Prior Publication Data

US 2018/0188475 A1 Jul. 5, 2018

Related U.S. Application Data

(60) Provisional application No. 62/441,570, filed on Jan. 3, 2017.

(30) Foreign Application Priority Data

Sep. 4, 2017 (CN) .......................... 2017 1 0784610

(51) Int. Cl.
| | |
|---|---|
| *G02B 7/02* | (2006.01) |
| *G02B 7/04* | (2006.01) |
| *G02B 7/00* | (2006.01) |
| *G02B 5/28* | (2006.01) |

(52) U.S. Cl.
CPC .............. *G02B 7/04* (2013.01); *G02B 7/003* (2013.01); *G02B 7/006* (2013.01); *G02B 7/02* (2013.01); *G02B 5/281* (2013.01)

(58) Field of Classification Search
CPC ...................................................... G02B 7/04

USPC ......................................................... 359/823
See application file for complete search history.

(56) References Cited

U.S. PATENT DOCUMENTS

2017/0195545 A1* 7/2017 Campbell .............. H04N 9/045

FOREIGN PATENT DOCUMENTS

| TW | M457892 | 7/2013 |
|---|---|---|
| TW | M475609 | 4/2014 |

OTHER PUBLICATIONS

"Office Action of Taiwan Counterpart Application", dated Apr. 18, 2018, p. 1-p. 8.

* cited by examiner

*Primary Examiner* — James C. Jones
(74) *Attorney, Agent, or Firm* — JCIPRNET (57) ABSTRACT

An optical filter switch module including a housing assembly and an optical filter switch is provided. The housing assembly includes a first housing and a second housing. The first housing has a first through hole extending along an axis. The second housing is disposed in the first housing along the axis and partially embedded in the first housing. The second housing has a second through hole corresponding to the first through hole. A thermal expansion coefficient of the first housing in the direction along the axis is smaller than a thermal expansion coefficient of the second housing in the direction along the axis. The optical filter switch is disposed on the second housing and partially corresponds to the position of the second through hole. A lens assembly having the optical filter switch module is further provided.

18 Claims, 8 Drawing Sheets

OPTICAL FILTER SWITCH MODULE AND LENS ASSEMBLY

CROSS-REFERENCE TO RELATED APPLICATION

This application claims the priority benefits of U.S. provisional application Ser. No. 62/441,570, filed on Jan. 3, 2017 and China application serial no. 201710784610.9, filed on Sep. 4, 2017. The entirety of each of the above-mentioned patent applications is hereby incorporated by reference herein and made a part of this specification.

BACKGROUND OF THE INVENTION

Field of the Invention

The invention relates to an optical filter switch module, particularly to an optical filter switch module applied to a lens assembly.

Description of Related Art

A general optical filtering lens assembly mainly includes an optical filter switch module and a lens, and an image sensor is disposed on one side of the optical filter switch module facing the lens, so that the lens can be accurately focused on the image sensor, wherein the optical filter switch module is, for example, an IR-cut filter removable (ICR) module.

With the development of technology, image sensors have been improved in resolution, and thus also have been improved in sensitivity to lens focusing. However, current general ICR modules are all made of plastic and may expand as the room temperature rises. At this moment, the focus of the lens shows a "front focus" state in which the lens cannot be accurately focused on the image sensor, thus causing blurred images.

SUMMARY OF THE INVENTION

The invention provides an optical filter switch module and a lens assembly, wherein a lens can be more accurately focused on an image sensor.

An optical filter switch module of the invention includes a housing assembly and an optical filter switch. The housing assembly includes a first housing and a second housing. The first housing has a first through hole extending along an axis. The second housing is disposed in the first housing along the axis and partially embedded in the first housing. The second housing has a second through hole corresponding to the first through hole. A thermal expansion coefficient of the first housing in the direction along the axis is smaller than a thermal expansion coefficient of the second housing in the direction along the axis. The optical filter switch is disposed on the second housing and partially corresponds to the position of the second through hole.

A lens assembly of the invention includes an optical filter switch module, a lens and an image sensor. The optical filter switch module includes a housing assembly and an optical filter switch. The housing assembly includes a first housing and a second housing. The first housing has a first through hole extending along an axis. The second housing is disposed in the first housing along the axis and partially embedded in the first housing. The second housing has a second through hole corresponding to the first through hole. A thermal expansion coefficient of the first housing in the direction along the axis is smaller than a thermal expansion coefficient of the second housing in the direction along the axis. The optical filter switch is disposed on the second housing and partially corresponds to the position of the second through hole. The lens is disposed on one side of the housing assembly along the axis and partially located in the second through hole. The image sensor is disposed on the other side of the housing assembly along the axis and is located at a focus of the lens.

In an embodiment of the invention, one of the first housing and the second housing includes at least one fitting groove, the other of the first housing and the second housing includes at least one fitting bump extending into the at least one fitting groove, and the fitting groove and the fitting bump have complementary shapes.

In an embodiment of the invention, the fitting groove is located on the first housing, the fitting bump is located on the second housing, and the fitting groove spans at least one outer surface on different planes of the first housing.

In an embodiment of the invention, a number of the fitting groove is plural, and the plurality of the fitting grooves are respectively formed on different outer surfaces of the first housing.

In an embodiment of the invention, the fitting groove is located on the first housing, the fitting bump is located on the second housing, the fitting bump extends from an inner surface of the first housing toward an outer surface of the first housing and into the fitting groove, and a dimension of the fitting groove on the outer surface of the first housing is greater than a dimension of the fitting groove on the inner surface of the first housing.

In an embodiment of the invention, the first housing has an inner wall surface surrounding the first through hole, and a portion of the second housing completely covers the inner wall surface of the first housing.

In an embodiment of the invention, the first housing has a first area, the second housing has a second area, the second area of the second housing overlaps the first area of the first housing along the axis, and a ratio of undulation and variation in an outline of an inner surface of the second housing in the second area is greater than a ratio of undulation and variation in an outline of the inner surface of the first housing in the first area.

In an embodiment of the invention, a material of the first housing includes metal, and a material of the second housing includes plastic.

In an embodiment of the invention, the material of the first housing includes an aluminum alloy, a zinc alloy or an iron-cobalt-nickel alloy, and the material of the second housing includes a liquid crystal polymer (LCP).

In an embodiment of the invention, a thickness of the second housing along the axis is 0.5 millimeters (mm) to 1 mm.

Based on the above, in the optical filter switch module and the lens assembly of the invention, the thermal expansion coefficient of the first housing is lower than the thermal expansion coefficient of the second housing. When the room temperature rises, the first housing undergoes less expansion, and a focus shift amount of the lens is thus reduced. Therefore, the focus of the lens can more accurately fall onto the image sensor.

To make the above features and advantages of the invention more comprehensible, several embodiments accompanied with drawings are described in detail as follows.

DETAILED DESCRIPTION OF DISCLOSED EMBODIMENTS

Figure 1:
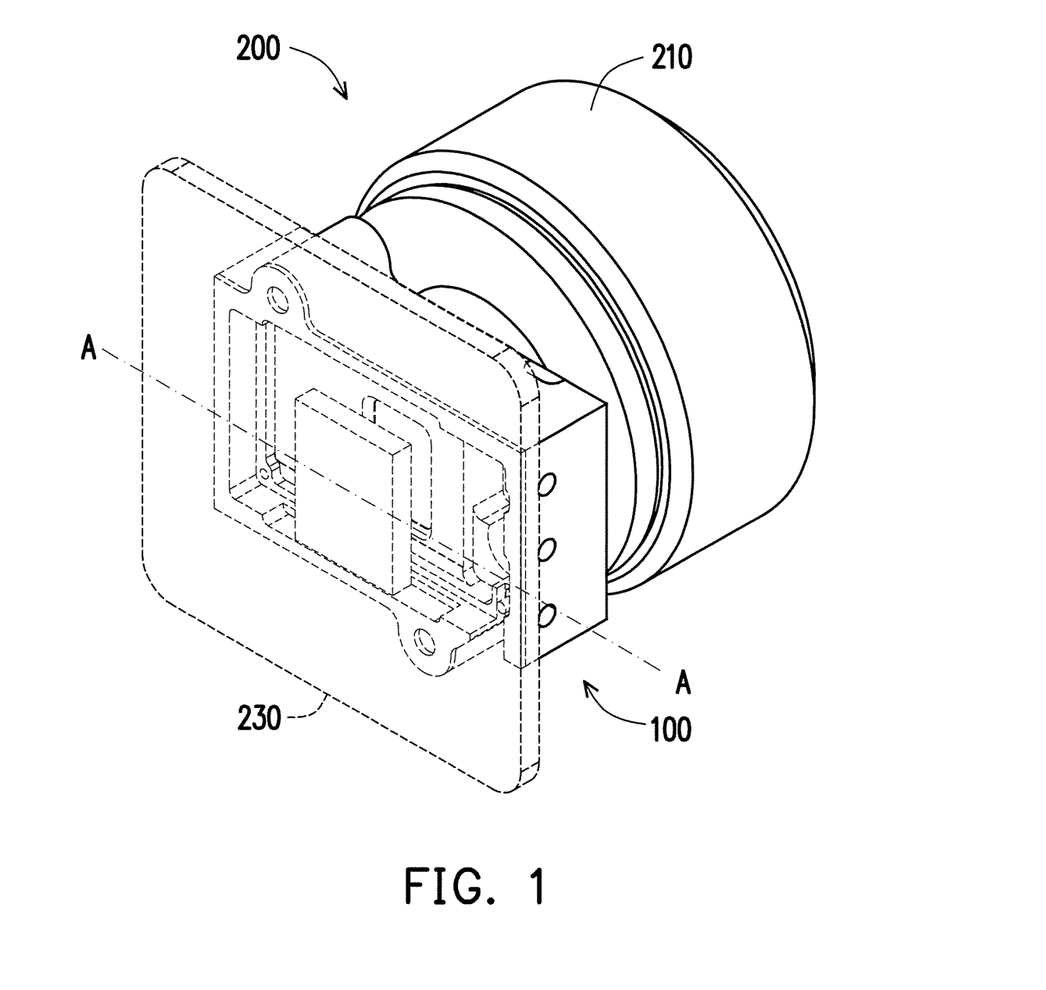
FIG. 1 is a schematic view of a lens assembly having an optical filter switch hidden therein according to an embodiment of the invention.
Figure 2:
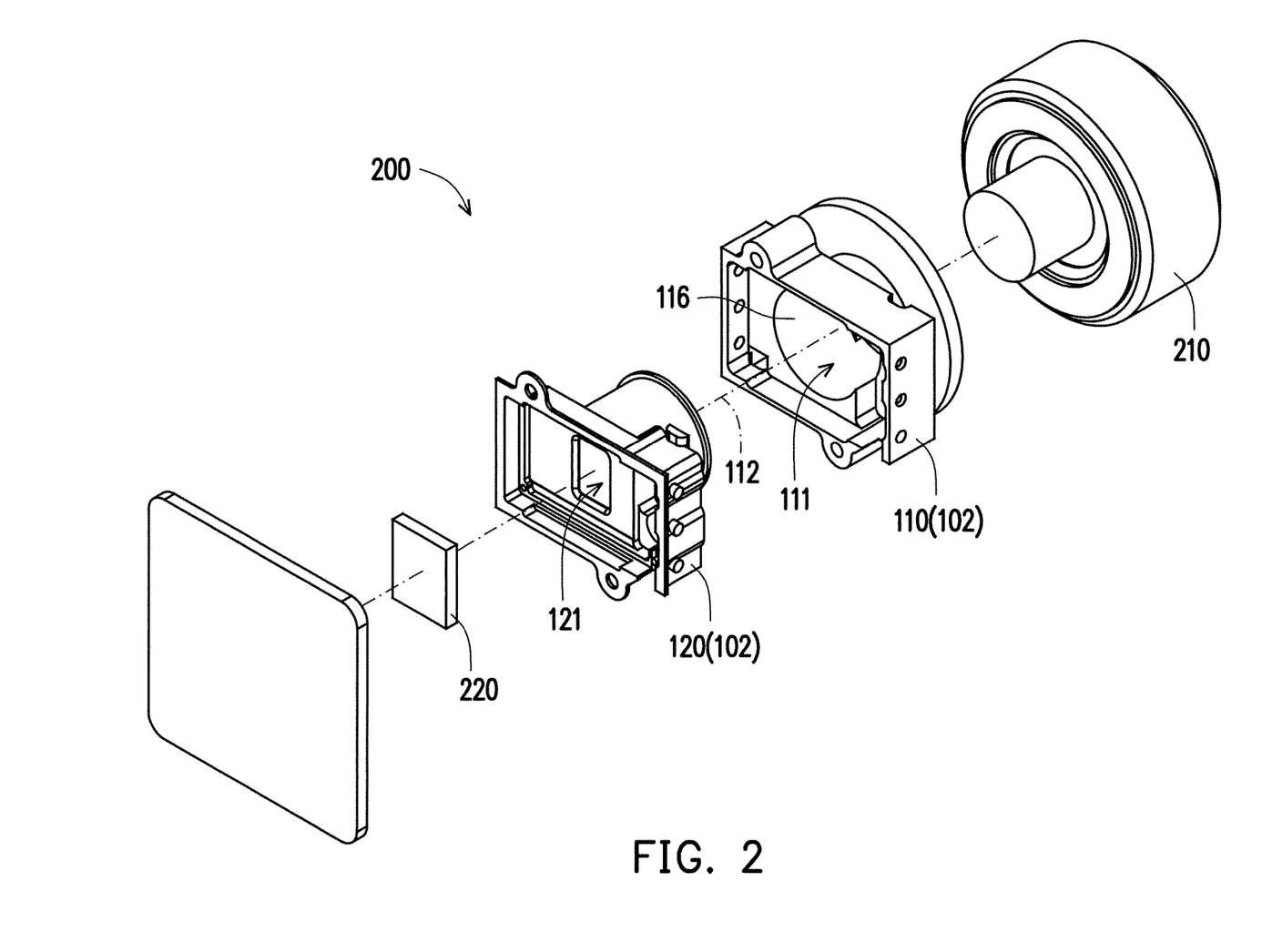
FIG. 2 is an exploded view of the lens assembly in FIG. 1.
Figure 3:
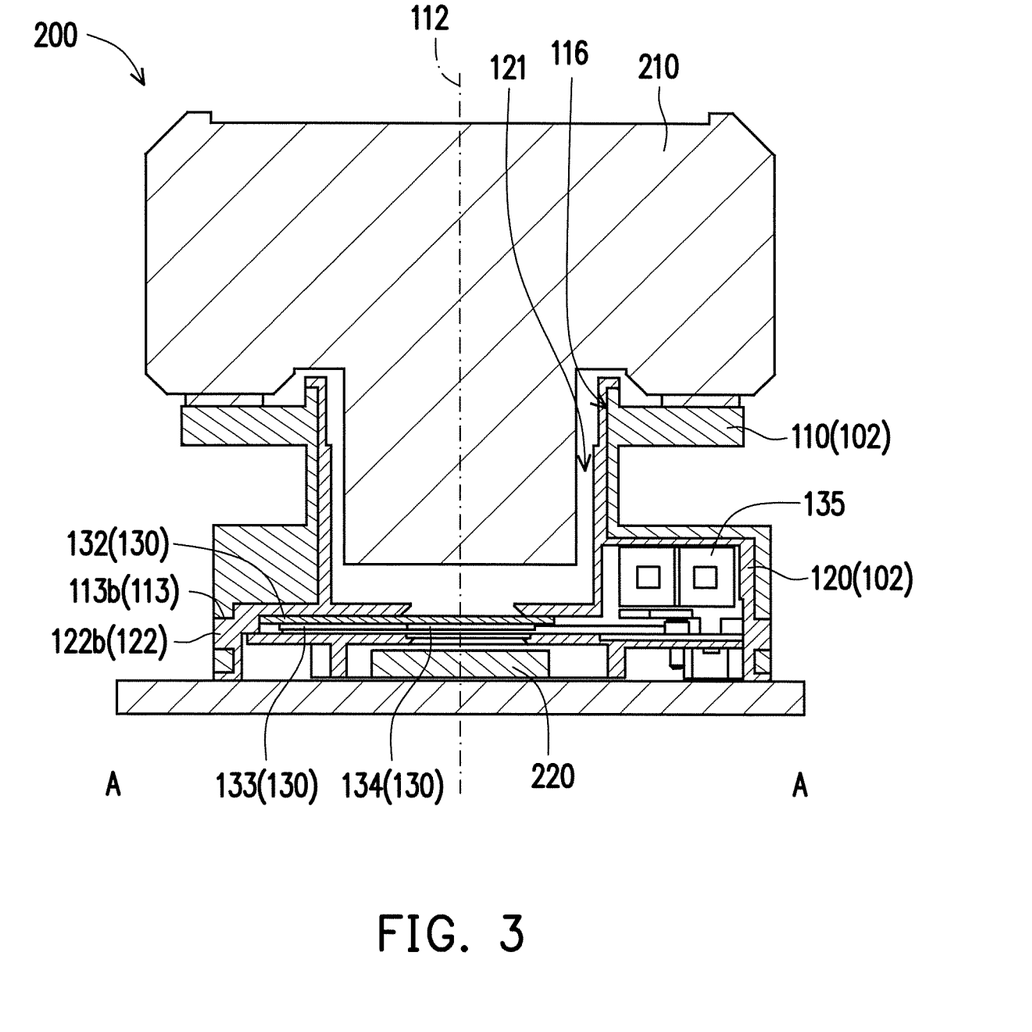
FIG. 3 is a cross-sectional view of the lens assembly in FIG. 1 along sectional line A-A.

FIG. 1 is a schematic view of a lens assembly having a optical filter switch hidden therein according to an embodiment of the invention. FIG. 2 is an exploded view of the lens assembly in FIG. 1. FIG. 3 is a cross-sectional view of the lens assembly in FIG. 1 along sectional line A-A. In FIG. 1, a circuit board 230 and a structure covered by the circuit board 230 are illustrated in dashed lines. To simplify the illustration, an optical filter switch 130 is omitted from FIG. 1 and FIG. 2. FIG. 3 illustrates that the optical filter switch 130 is disposed in a second housing 120. Referring to FIG. 1 to FIG. 3 together, a lens assembly 200 includes an optical filter switch module 100, a lens 210 disposed on one side of the optical filter switch module 100, and an image sensor 220 and the circuit board 230 disposed on the other side of the optical filter switch module 100, wherein the image sensor 220 is located at a focus of the lens 210 and is electrically connected to the circuit board 230.

Figure 7:
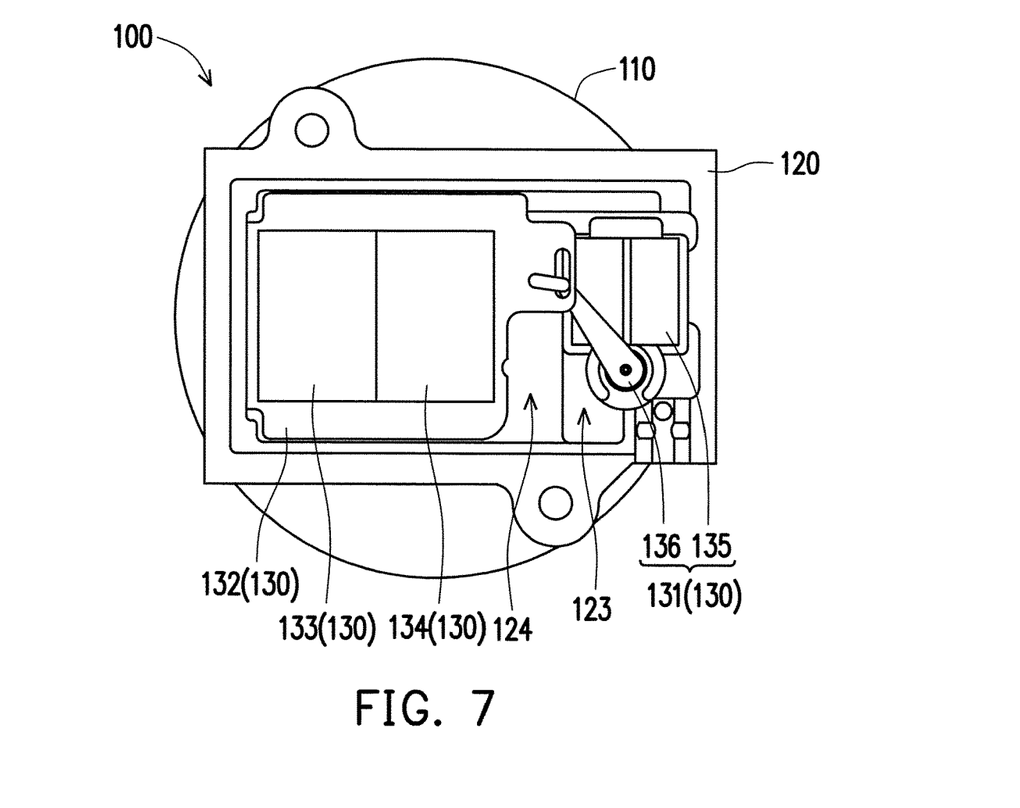
FIG. 7 illustrates a schematic view showing that the optical filter switch is disposed inside the lens assembly in FIG. 1.

In detail, the optical filter switch module 100 includes a housing assembly 102 and the optical filter switch 130 (referring to FIG. 3 and FIG. 7 together). The housing assembly 102 includes a first housing 110 and the second housing 120. The first housing 110 has a first through hole 111 extending along an axis 112. The second housing 120 is disposed in the first housing 110 along the axis 112 and is partially embedded in the first housing 110, wherein the second housing 120 has a second through hole 121 corresponding to the first through hole 111, the first housing 110 has an inner wall surface 116 surrounding the first through hole 111, and a portion of the second housing 120 located in the first through hole 111 completely covers the inner wall surface 116 of the first housing 110.

The optical filter switch 130 is disposed on the housing assembly 102 and partially corresponds to the position of the second through hole 121. The lens 210 is disposed on one side of the housing assembly 102 along the axis 112. For example, the lens 210 is disposed on a side of the first housing 110. The image sensor 220 is disposed on the other side of the housing assembly 102 along the axis 112. For example, the image sensor 220 is disposed on a side of the second housing 120, and a portion of the lens 210 is located in the second through hole 121. In the present embodiment, the axis 112 of the first through hole 111 is exactly an optical axis. External light may enter the second through hole 121 of the second housing 120 along the axis 112 via the lens 210, and the light further passes through the portion of the optical filter switch 130 that corresponds to the second through hole 121 and is focused on the image sensor 220. However, in other embodiments, the optical axis is not limited to the axis 112.

Figure 4:
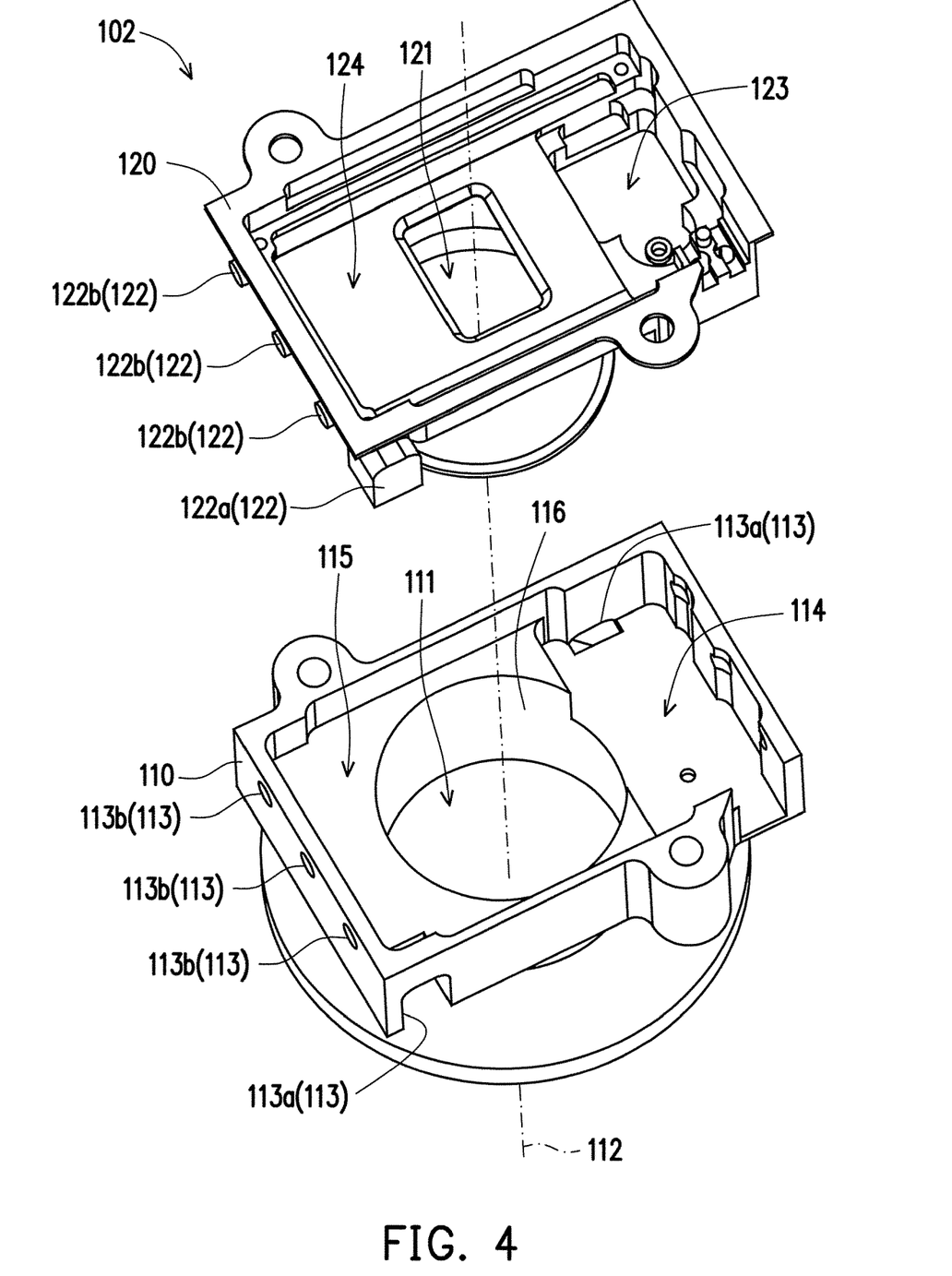
FIG. 4 is a schematic enlarged view of a housing assembly of the lens assembly in FIG. 2 from another angle.
Figure 5:
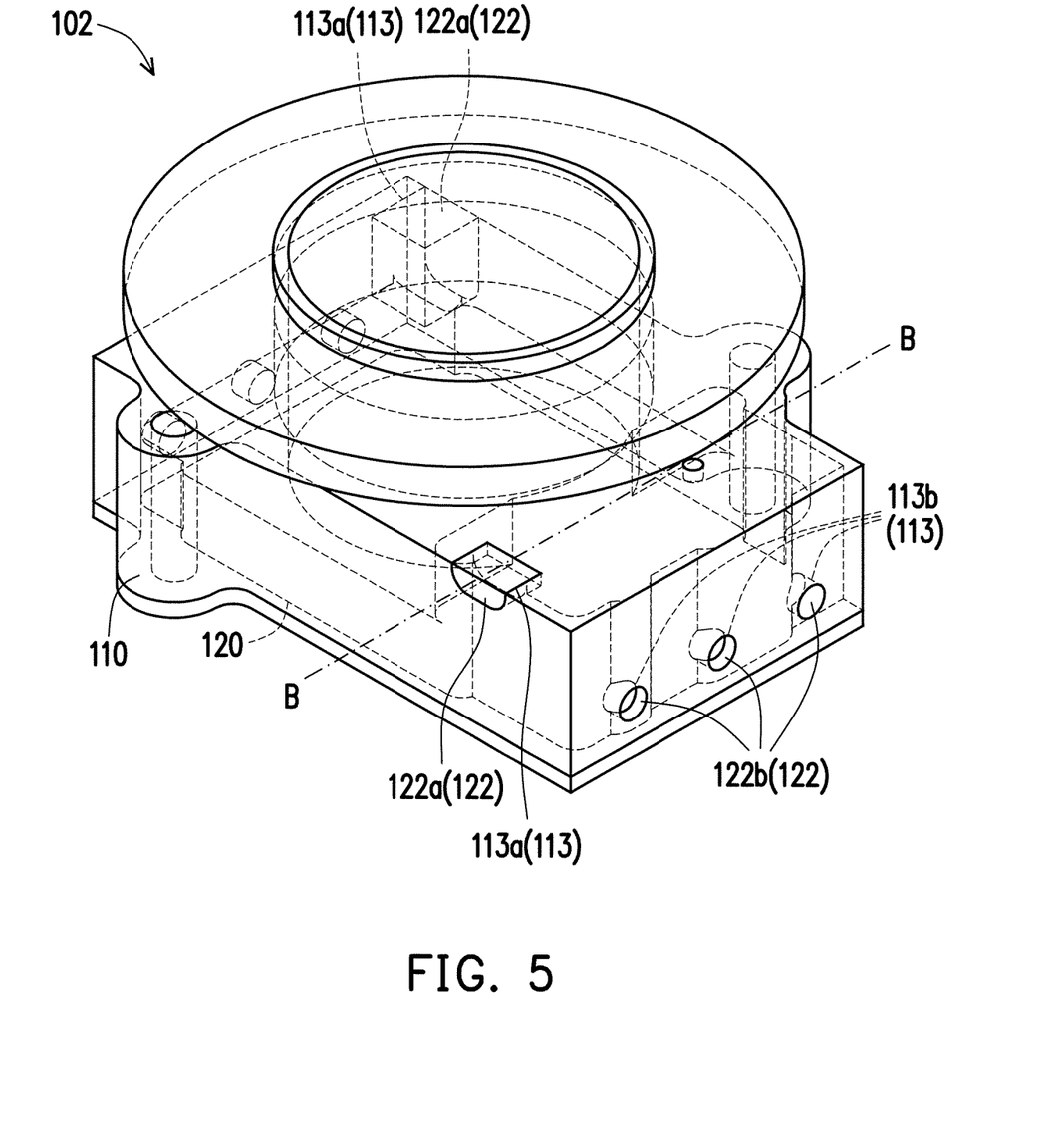
FIG. 5 is a schematic view of the housing assembly of the lens assembly in FIG. 1.
Figure 6:
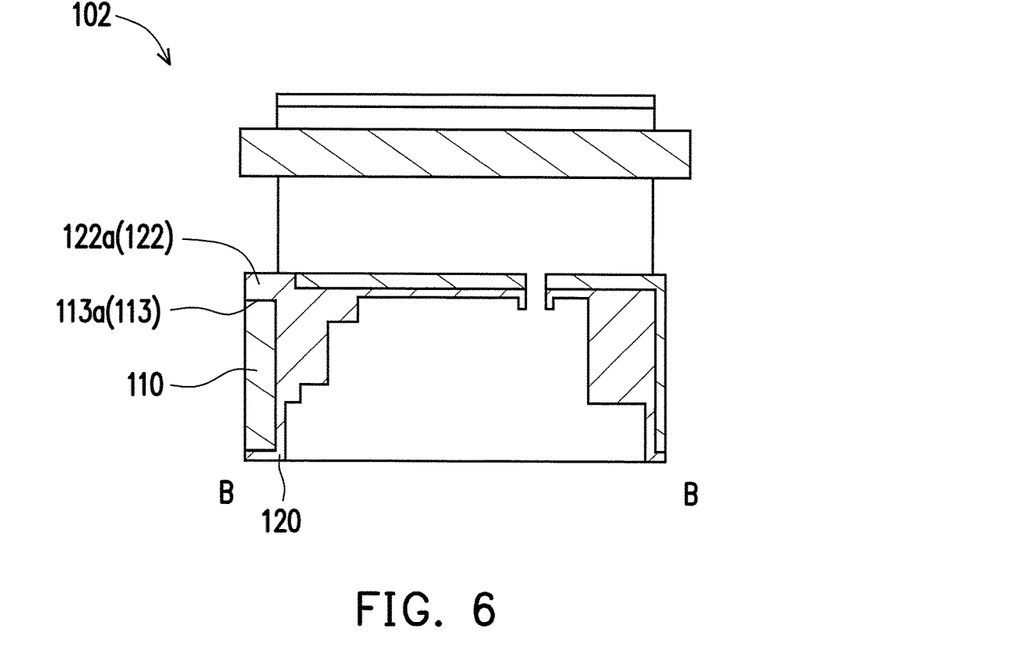
FIG. 6 is a cross-sectional view of the housing assembly in FIG. 5 along sectional line B-B.

FIG. 4 is a schematic enlarged view of a housing assembly of the lens assembly in FIG. 2 from another angle. FIG. 5 is a schematic view of the housing assembly of the lens assembly in FIG. 1. FIG. 6 is a cross-sectional view of the housing assembly in FIG. 5 along sectional line B-B. For clear illustration and ease of explanation, in FIG. 5, external outlines of the first housing 110 and the second housing 120, a fitting groove 113 and a fitting bump 122 are illustrated in dashed lines. Referring to FIG. 1 to FIG. 6 together, in the present embodiment, the housing assembly 102 may be fabricated by insert molding.

In detail, a material of the first housing 110 may be metal, preferably, e.g., an aluminum alloy or zinc alloy having a lower expansion coefficient, more preferably, e.g., an iron-cobalt-nickel alloy having an even lower expansion coefficient. A material of the second housing 120 may be plastic, e.g., a liquid crystal polymer (LCP). Herein, the materials of the first housing 110 and the second housing 120 are not particularly limited as long as a thermal expansion coefficient of the first housing 110 in the direction along the axis 112 is smaller than a thermal expansion coefficient of the second housing 120 in the direction along the axis 112. In this way, when the room temperature rises, since the first housing 110 has less expansion in the direction along the axis 112 and a focus shift amount of the lens 210 is thus reduced, the focus of the lens 210 can more accurately fall onto the image sensor 220, which is in line with the trend of the image sensor 220 toward high resolution.

Referring to FIG. 4, in the present embodiment, the metal-made first housing 110 may be machined using a computer numerical control (CNC) machine tool. After machining of the first housing 110 is completed, the first housing 110 is placed in a mold cavity to serve as an insert. Next, plastic is filled into the mold cavity to form the second housing 120 and the second housing 120 is embedded in the first housing 110, thus obtaining the complete housing assembly 102 (illustrated in FIG. 5). For example, a thickness of the housing assembly 102 along the axis 112 is about 12 mm to 15 mm, and a thickness of the second housing 120 along the axis 112 is only about 0.5 mm to 1 mm. Since the second housing 120 occupies a smaller proportion of the whole housing assembly 102, expansion in the plastic-made second housing 120 caused by the rise in room temperature can be reduced, and the focus shift amount of the lens 210 can be reduced. In addition, since the portion of the plastic-made second housing 120 located in the first through hole 111 completely covers the inner wall surface 116 (illustrated in FIG. 3) of the metal-made first housing 110 that surrounds the first through hole 111, the light can be prevented from being reflected when passing through the second through hole 121, thus ensuring sensing quality of the image sensor 220.

In the present embodiment, the first housing 110 has a first area 114 and a third area 115 adjacent to the first area 114, and the second housing 120 has a second area 123 and a fourth area 124 adjacent to the second area 123, wherein the second area 123 of the second housing 120 overlaps the first area 114 of the first housing 110 along the axis 112, the fourth area 124 of the second housing 120 overlaps the third area 115 of the first housing 110 along the axis 112, and a ratio of undulation and variation in an outline of an inner surface of the second housing 120 in the second area 123 is greater than a ratio of undulation and variation in an outline of an inner surface of the first housing 110 in the first area 114. In other words, structural complexity of the second housing 120 in the second area 123 is greater than structural complexity of the first housing 110 in the first area 114.

FIG. 7 illustrates a schematic view showing that the optical filter switch is disposed inside the lens assembly in FIG. 1, wherein the optical filter switch 130 is disposed in the second housing 120. Referring to FIG. 3 and FIG. 7 together, in the present embodiment, the optical filter switch 130 further includes a moving mechanism 131 disposed within the second area 123, a carrier 132 disposed within the fourth area 124 and connected to the moving mechanism 131, and an optical filter 133 and a light transmitting sheet 134 disposed on the carrier 132, wherein the carrier 132 is suitable for being driven by the moving mechanism 131 to align the optical filter 133 or the light transmitting sheet 134 with the second through hole 121. For example, the optical filter 133 may be an IR-cut filter for filtering light having an infrared wavelength. However, the optical filter of the present embodiment is not limited to IR-cut filters. In other embodiments, the optical filter may be a optical filter for filtering light having any other wavelength. On the other hand, the light transmitting sheet 134 may be transparent glass or transparent plastic and does not have the function of filtering light having a specific wavelength. In other words, the light transmitting sheet 134 itself does not attenuate light having a specific wavelength.

It should be noted that, the moving mechanism 131 further includes a motor 135 fixed within the second area 123 of the second housing 120 and a rotating arm 136 connecting the carrier 132 with the motor 135. The motor 135 controls rotation of the rotating arm 136 so as to move the carrier 132 back and forth between the second area 123 and the fourth area 124, thereby controlling one of the optical filter 133 and the light transmitting sheet 134 to be aligned with the second through hole 121, thus determining whether the light received by the image sensor 220 contains the light having an infrared wavelength. As mentioned above, the structural complexity of the second housing 120 in the second area 123 is greater than the structural complexity of the first housing 110 in the first area 114. The main reason thereof is that, as the elements such as the motor 135 and the rotating arm 136 must be disposed within the second area 123 of the second housing 120, sufficient fixing structures are required in the second area 123. When the housing assembly 102 is fabricated by insert molding of the metal-made first housing 110 and the plastic-made second housing 120, since the complex structure for disposing the motor 135 and the rotating arm 136 is designed to be within the second area 123 of the second housing 120, there is no need to machine the complex structure for disposing the motor 135 and the rotating arm 136 by CNC. In other words, by means of insert molding, the complex structure for disposing the motor 135 and the rotating arm 136 can be machined more easily using plastic so that costs can be effectively reduced.

Referring to FIG. 4 to FIG. 6, one of the first housing 110 and the second housing 120 includes at least one fitting groove 113, the other of the first housing 110 and the second housing 120 includes at least one fitting bump 122 extending into the at least one fitting groove 113, and the fitting groove 113 and the fitting bump 122 have complementary shapes.

In the present embodiment, the fitting groove 113 is located on the first housing 110, the fitting bump 122 protrudes from an outer surface of the second housing 120, and the fitting bump 122 extends from the inner surface of the first housing 110 toward an outer surface of the first housing 110 and into the fitting groove 113. In other embodiments, the fitting groove may also be located on the second housing, and the fitting bump may be located on the first housing. The invention is not particularly limited thereto.

In detail, the fitting groove 113 includes a first fitting groove 113a and a second fitting groove 113b, and the fitting bump 122 includes a first fitting bump 122a and a second fitting bump 122b. The first fitting bump 122a extends into the first fitting groove 113a, and the first fitting groove 113a and the first fitting bump 122a have complementary shapes. The second fitting bump 122b extends into the second fitting groove 113b, and the second fitting groove 113b and the second fitting bump 122b have complementary shapes.

To be more specific, the first fitting groove 113a spans at least one outer surface on different planes of the first housing 110. Herein, the present embodiment gives an example where the first fitting groove 113a spans two outer surfaces on different planes of the first housing 110. However, other embodiments are not limited thereto. For example, the first fitting groove may span a plurality of outer surfaces on different planes of the first housing, wherein the plurality of outer surfaces on the different planes of the first housing may be planes, curved surfaces, or a combination of planes and curved surfaces. The present embodiment gives an example where the first housing 110 has two first fitting grooves 113a disposed thereon. Moreover, the first fitting grooves 113a are, for example, respectively disposed on two opposite corner sides of the first housing 110. However, the number of the first fitting groove 113a is not particularly limited. For example, in other embodiments, the number of the first fitting groove may be one. Under such arrangement, the second housing 120 can be stably embedded in the first housing 110 so that the second housing 120 is prevented from deviating from the first housing 110. Thus, the chance of shift of the focus of the lens 210 is reduced and the focus of the lens 210 can fall onto the image sensor 220. In addition, since the first fitting groove 113a spans the outer surfaces on different planes of the first housing 110, the effect of stably embedding the second housing 120 in the first housing 110 can be achieved simply by forming only one first fitting groove 113a on the first housing 110. In this way, the difficulty that designers experience in designing molds can be reduced, the designing of molds can thus be sped up, labor consumption can thus be reduced and design costs can thus be lowered.

On the other hand, the number of the second fitting groove 113b may be plural, and the plurality of the second fitting grooves 113b are respectively formed on different outer surfaces of the first housing 110. However, the number of the second fitting groove 113b is not particularly limited. For example, in other embodiments, the number of the second fitting groove may be one. Herein, the present embodiment gives an example where different planes serve as the outer surface. In other embodiments, different outer surfaces of the first housing may be planes, curved surfaces, or a combination of planes and curved surfaces. The invention is not particularly limited thereto. On the other hand, the present embodiment gives an example where three second fitting grooves 113b are formed on each of the planes on two opposite sides of the first housing 110. In other embodiments, the number of the second fitting groove 113b is not particularly limited. For example, in other embodiments, one single second fitting groove may be formed on one single plane; alternatively, in other embodiments, one single second fitting groove may be formed on each of a plurality of planes, as long as displacement of the second housing 120 in the first housing 110 can be limited. Therefore, the fitting groove 113 of the invention may be designed in diverse ways, which allows designers to perform the design process according to actual needs, thus providing higher design flexibility.

Figure 8A:
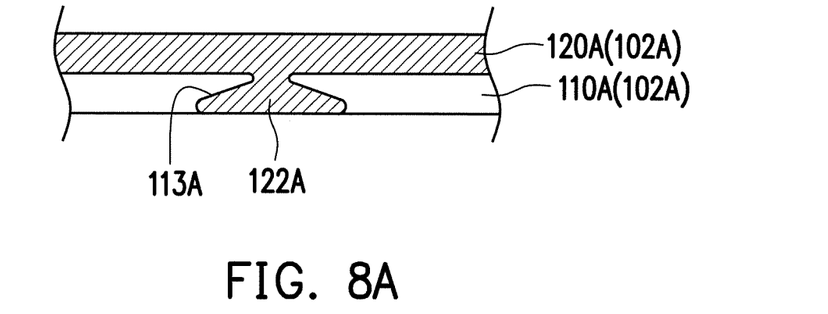
FIGS. 8A to 8D are schematic views of different embodiments of fitting grooves and fitting bumps of the housing assembly in FIG. 7.

FIGS. 8A to 8D are schematic views of different embodiments of fitting grooves and fitting bumps of the housing assembly in FIG. 7. Referring to FIG. 8A, in the present embodiment, a housing assembly 102A includes a first housing 110A and a second housing 120A. A fitting groove 113A is located on the first housing 110A, a fitting bump 122A protrudes from an outer surface of the second housing 120A, and the fitting bump 122A extends from an inner surface of the first housing 110A toward an outer surface of the first housing 110A and into the fitting groove 113A. In the present embodiment, the fitting groove 113A exhibits a gradually expanding shape from the inner surface of the first housing 110A toward the outer surface of the first housing 110A, and the fitting groove 113A has round corners at turning points of the outline.

Figure 8B:
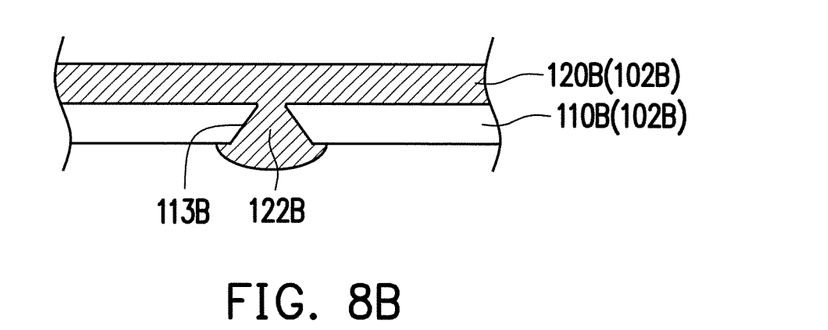

Referring to FIG. 8B, in the present embodiment, a housing assembly 102B includes a first housing 110B and a second housing 120B. A fitting bump 122B protruding from an outer surface of the second housing 120B extends from an inner surface of the first housing 110B toward an outer surface of the first housing 110B and into a fitting groove 113B located on the first housing 110B. The fitting groove 113B exhibits a gradually expanding shape from the inner surface of the first housing 110B toward the outer surface of the first housing 110B, and the fitting bump 122B protrudes from the outer surface of the first housing 110B.

Figure 8C:
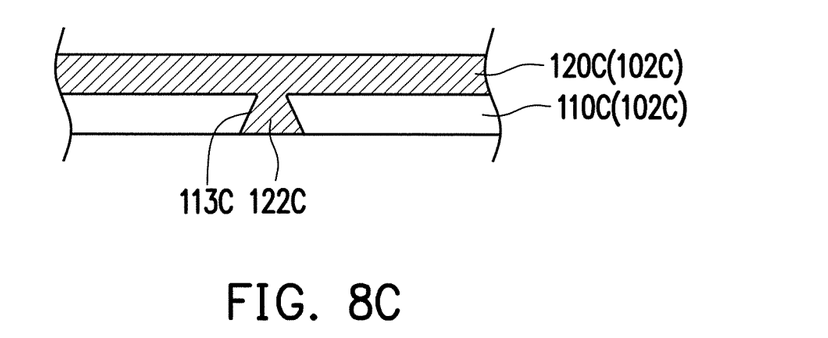

Referring to FIG. 8C, in the present embodiment, a housing assembly 102C includes a first housing 110C and a second housing 120C. A fitting bump 122C protruding from an outer surface of the second housing 120C extends from an inner surface of the first housing 110C toward an outer surface of the first housing 110C and into a fitting groove 113C located on the first housing 110C. The fitting groove 113C exhibits a gradually expanding shape from the inner surface of the first housing 110C toward the outer surface of the first housing 110C, and the fitting bump 122C is flush with the outer surface of the first housing 110C.

Figure 8D:
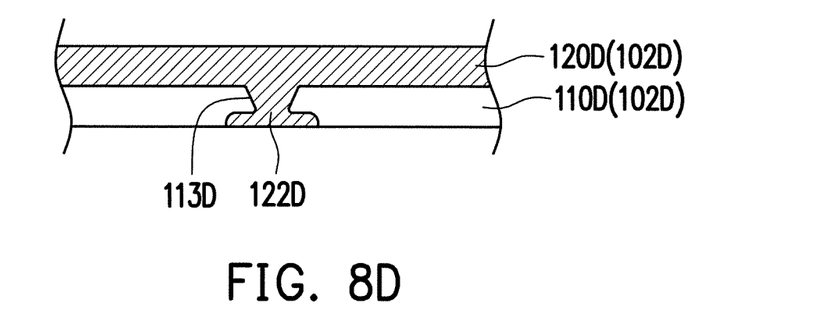

Referring to FIG. 8D, in the present embodiment, a housing assembly 102D includes a first housing 110D and a second housing 120D. A fitting bump 122D protruding from an outer surface of the second housing 120D extends from an inner surface of the first housing 110D toward an outer surface of the first housing 110D and into a fitting groove 113D located on the first housing 110D. In the present embodiment, the fitting groove 113D first exhibits a gradually shrinking shape from the inner surface of the first housing 110D toward the outer surface of the first housing 110D, and a dimension of the fitting groove 113D on the outer surface of the first housing 110D is greater than a dimension of the fitting groove 113D on the inner surface of the first housing 110D.

As shown in FIGS. 8A to 8D, the dimensions of the fitting grooves 113A, 113B, 113C and 113D on the outer surfaces of the first housings 110A, 110B, 110C and 110D are respectively greater than the dimensions of the fitting grooves 113A, 113B, 113C and 113D on the inner surfaces of the first housings 110A, 110B, 110C and 110D. As long as the above is satisfied, the fitting bumps 122A, 122B, 122C and 122D can be more reliably inserted into the fitting grooves 113A, 113B, 113C and 113D, so that the second housings 120A, 120B, 120C and 120D can further be stably embedded in the first housings 110A, 110B, 110C and 110D, so as to prevent the second housings 120A, 120B, 120C and 120D from deviating from the first housings 110A, 110B, 110C and 110D. Thus, the chance of shift of the focus of the lens is reduced and the focus of the lens can fall onto the image sensor.

Figure 9:
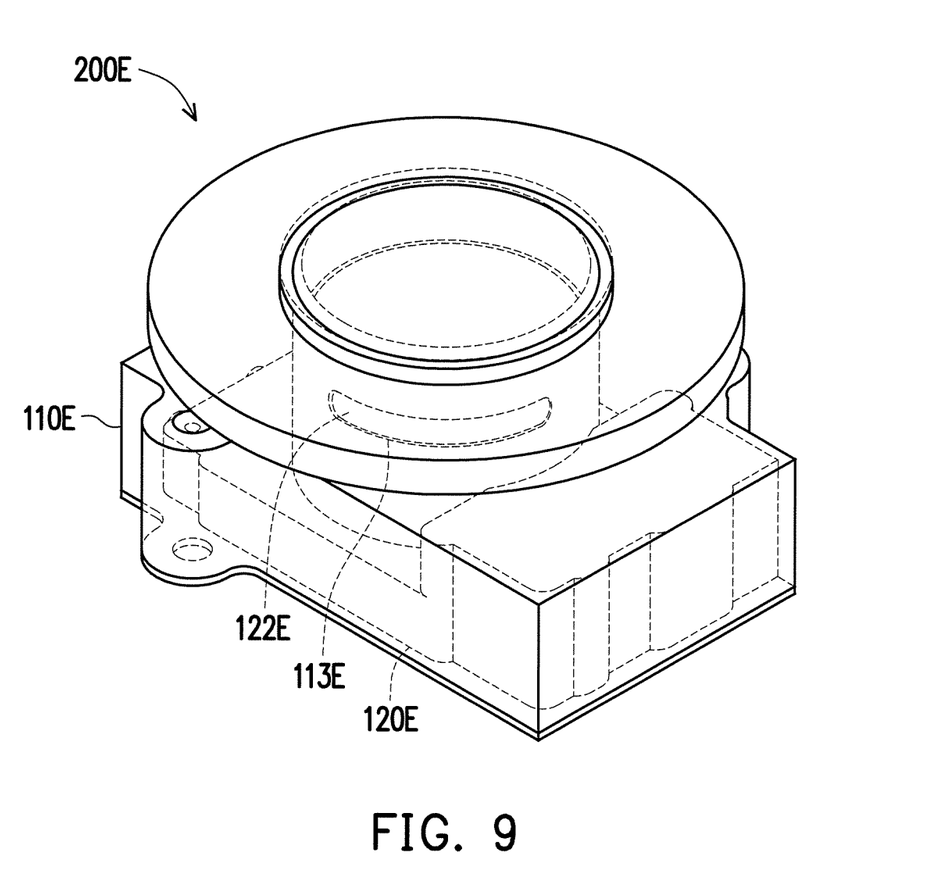
FIG. 9 is a schematic view of a lens assembly according to another embodiment of the invention.

FIG. 9 is a schematic view of a lens assembly according to another embodiment of the invention. Referring to FIG. 9, members of a lens assembly 200E of the present embodiment that are the same as or similar to those of the aforementioned embodiments are denoted by the same or similar reference numerals, and descriptions thereof are not repeated herein.

The present embodiment gives an example where the numbers of a fitting groove 113E and a fitting bump 122E are each one. However, in other embodiments, the numbers of the fitting groove and the fitting bump may be plural. In detail, a first housing 110E includes one single fitting groove 113E formed on a curved surface of the first housing 110E. A second housing 120E includes one single fitting bump 122E protruding from a curved surface of the second housing 120E. The fitting bump 122E extends from an inner surface of the first housing 110E toward an outer surface of the first housing 110E and into the fitting groove 113E. That is, in addition to being disposed on planes, the fitting groove 113E and the fitting bump 122E may also be disposed on the curved surfaces of the first housing 110E and the second housing 120E. Therefore, by means of insert molding, the invention makes it possible to machine any complex structure required for a workpiece, so that costs can be effectively reduced, and that different design needs at a machining site can be satisfied.

In summary, in the lens assembly provided by the invention, when the room temperature rises, since the first housing has less expansion in the direction along the axis and the focus shift amount of the lens is thus reduced, the focus of the lens can more accurately fall onto the image sensor, which is in line with the trend of the image sensor toward high resolution. In addition, since the portion of the plastic-made second housing located in the first through hole completely covers the inner wall surface of the metal-made first housing that surrounds the first through hole, light can be prevented from being reflected when passing through the second through hole, thus ensuring sensing quality of the image sensor. Moreover, by means of insert molding, the complex structure for disposing the motor and the rotating aim can be machined more easily using plastic so that costs can be effectively reduced.

On the other hand, due to the design of the fitting groove and the fitting bump, the second housing can be stably embedded in the first housing so that the second housing is prevented from deviating from the first housing. Thus, the chance of shift of the focus of the lens is reduced and the focus of the lens can fall onto the image sensor. Moreover, the fitting groove may be designed in diverse ways, which allows designers to perform the design process according to actual needs, thus providing higher design flexibility.

Although the invention has been described with reference to the above embodiments, it will be apparent to persons of ordinary skill in the art that modifications to the described embodiments may be made without departing from the spirit of the invention. Accordingly, the scope of the invention will be defined by the attached claims and not by the above detailed descriptions.

What is claimed is:
1. An optical filter switch module comprising:
a housing assembly comprising:
a first housing having a first through hole extending along an axis; and a second housing disposed in the first housing along the axis and partially embedded in the first housing, the second housing having a second through hole corresponding to the first through hole, a thermal expansion coefficient of the first housing in a direction along the axis being smaller than a thermal expansion coefficient of the second housing in the direction along the axis, wherein one of the first housing and the second housing comprises at least one fitting groove, the other of the first housing and the second housing comprises at least one fitting bump extending into the at least one fitting groove, and the fitting groove and the fitting bump have complementary shapes; and an optical filter switch disposed on the second housing and partially corresponding to a position of the second through hole.

2. The optical filter switch module according to claim 1, wherein the fitting groove is located on the first housing, the fitting bump is located on the second housing, and the fitting groove spans at least one outer surface on different planes of the first housing.

3. The optical filter switch module according to claim 2, wherein a number of the fitting groove is plural, and the plurality of the fitting grooves are respectively formed on different outer surfaces of the first housing.

4. The optical filter switch module according to claim 1, wherein the fitting groove is located on the first housing, the fitting bump is located on the second housing, the fitting bump extends from an inner surface of the first housing toward an outer surface of the first housing and into the fitting groove, and a dimension of the fitting groove on the outer surface of the first housing is greater than a dimension of the fitting groove on the inner surface of the first housing.

5. The optical filter switch module according to claim 1, wherein the first housing has an inner wall surface surrounding the first through hole, and a portion of the second housing completely covers the inner wall surface of the first housing.

6. The optical filter switch module according to claim 1, wherein the first housing has a first area, the second housing has a second area, the second area of the second housing overlaps the first area of the first housing along the axis, and a ratio of undulation and variation in an outline of an inner surface of the second housing in the second area is greater than a ratio of undulation and variation in an outline of an inner surface of the first housing in the first area.

7. The optical filter switch module according to claim 1, wherein a material of the first housing comprises metal, and a material of the second housing comprises plastic.

8. The optical filter switch module according to claim 7, wherein the material of the first housing comprises an aluminum alloy, a zinc alloy or an iron-cobalt-nickel alloy, and the material of the second housing comprises a liquid crystal polymer (LCP).

9. The optical filter switch module according to claim 1, wherein a thickness of the second housing along the axis is 0.5 mm to 1 mm.

10. A lens assembly comprising:
an optical filter switch module comprising:
a housing assembly comprising:
a first housing having a first through hole extending along an axis; and
a second housing disposed in the first housing along the axis and partially embedded in the first housing, the second housing having a second through hole corresponding to the first through hole, a thermal expansion coefficient of the first housing in a direction along the axis being smaller than a thermal expansion coefficient of the second housing in the direction along the axis, wherein one of the first housing and the second housing comprises at least one fitting groove, the other of the first housing and the second housing comprises at least one fitting bump extending into the at least one fitting groove, and the fitting groove and the fitting bump have complementary shapes; and a optical filter switch disposed on the second housing and partially corresponding to a position of the second through hole;

a lens disposed on one side of the housing assembly along the axis and partially located in the second through hole; and an image sensor disposed on the other side of the housing assembly along the axis and located at a focus of the lens.

11. The lens assembly according to claim 10, wherein the fitting groove is located on the first housing, the fitting bump is located on the second housing, and the fitting groove spans at least one outer surface on different planes of the first housing.

12. The lens assembly according to claim 11, wherein a number of the fitting groove is plural, and the plurality of the fitting grooves are respectively formed on different outer surfaces of the first housing.

13. The lens assembly according to claim 10, wherein the fitting groove is located on the first housing, the fitting bump is located on the second housing, the fitting bump extends from an inner surface of the first housing toward an outer surface of the first housing and into the fitting groove, and a dimension of the fitting groove on the outer surface of the first housing is greater than a dimension of the fitting groove on the inner surface of the first housing.

14. The lens assembly according to claim 10, wherein the first housing has an inner wall surface surrounding the first through hole, and a portion of the second housing completely covers the inner wall surface of the first housing.

15. The lens assembly according to claim 10, wherein the first housing has a first area, the second housing has a second area, the second area of the second housing overlaps the first area of the first housing along the axis, and a ratio of undulation and variation in an outline of an inner surface of the second housing in the second area is greater than a ratio of undulation and variation in an outline of an inner surface of the first housing in the first area.

16. The lens assembly according to claim 10, wherein a material of the first housing comprises metal, and a material of the second housing comprises plastic.

17. The lens assembly according to claim 16, wherein the material of the first housing comprises an aluminum alloy, a zinc alloy or an iron-cobalt-nickel alloy, and the material of the second housing comprises a liquid crystal polymer (LCP).

18. The lens assembly according to claim 10, wherein a thickness of the second housing along the axis is 0.5 mm to 1 mm.

* * * * *